United States Patent Office 3,002,027
Patented Sept. 26, 1961

3,002,027
NUCLEAR DICHLORINATION OF XYLENES
Robert F. Lindemann and Alex Hlynsky, Painesville, Ohio, assignors to Diamond Alkali Company, Cleveland, Ohio, a corporation of Delaware
No Drawing. Filed May 5, 1958, Ser. No. 732,832
5 Claims. (Cl. 260—650)

The present invention relates to improvements in the halogenation of ortho, meta and para-xylenes and specifically relates to improvements in the process of preparing dihalogenated xylenes.

The chlorination of various xylenes including p-xylene is known. For example, U.S. Patent 2,412,389 discloses the chlorination of p-xylene in the presence of a catalyst and $CCl_4$ to yield chlorine-containing materials including 2,5-dichloro-p-xylene and trichloro-p-xylene.

Although the chlorination processes disclosed in this reference may be of interest when a mixture of dichloro, trichloro and tetrachloro nuclear-substituted p-xylenes is desired or tolerable, in certain instances, a selective chlorination is required. Such a selective chlorination would be the chlorination of p-xylene to form only mono- and dinuclear chloro substituted p-xylene.

It has now been found that this may be accomplished through the employment of a "nuclear chlorination stopping agent," i.e., an agent such as a solvent which permits no more than 2 chlorine atoms to be substituted on the nucleus of a xylene such as p-xylene.

A principal object of the invention is the production of a high yield of nuclear dichloro substituted xylene derivatives, especially 2,5-dichloro-p-xylene.

Another object of the present invention is the provision of such a halogenation process which can be carried out at temperatures preferably below 100° C.

Still another object of the invention is the provision of a halogenation process which does not require a large excess of halogenating agent, i.e., chlorine, thus reducing the cost of raw materials and improving the efficiency of the process.

Still another object of the invention is the provision of a new and improved method of producing 2,5-dichloro-p-xylene substantially free from higher chlorinated compounds.

Other objects and advantages of the present invention will be apparent to those skilled in the art from the following description thereof.

Broadly the present invention comprises the method of producing nuclear di-halo-substituted xylenes by halogenating a xylene in the presence of an acetic acid.

It has now been found that p-xylene and m-xylene may be dichlorinated to nuclear dichloro-p-xylene and m-xylene respectively by reacting chlorine with either p-xylene or m-xylene in the presence of an acetic acid, preferably glacial acetic acid. In general, it is desirable to employ a catalyst to facilitate chlorination.

The process of this invention may be carried out by combining the reactants according to the proportion listed in Table I:

TABLE I

| Reactant | Reactant Proportions: Parts by weight | |
|---|---|---|
| | (Typical) | (Preferred) |
| glacial acetic acid | 2.7–10.0 | 3.7–4.1. |
| xylene | 1.0 | 1.0. |
| chlorine | 0.8–2.0 | 1.30–1.60. |
| catalyst | 0–0.4 | $FeCl_3$, 0.005–0.010. |

The reactants may be mixed at a temperature between about 40° and 90° C., a specifically preferred reaction temperature being about 70° C. The reaction is preferably carried to completion or until a predetermined amount of hydrogen chloride is evolved or collected.

The resultant product, i.e., 2,5-dichloro-p-xylene, may be recovered typically through precipitation by pouring the crude chlorination product into an excess of water, i.e., by pouring the crude product into an excess of water to precipitate the 2,5-dichloro-p-xylene and separating the thus-precipitated product by filtration or centrifugation. The resultant solid product may be further purified by recrystallization from an organic alcohol such as ethanol or other solvents such as acetic acid, isopropanol, or xylene.

A by-product oil resulting from the chlorination of p-xylene comprises a mixture of nuclear-substituted mono and dichloro xylenes such as 2-chloro-p-xylene; 2,3-dichloro-p-xylene and 2,5-dichloro-p-xylene. This oil advantageously may be further chlorinated to produce higher chlorination products such as higher chain and ring chlorinated xylenes if desired.

The catalyst advantageously employed in the practice of this invention may be iodine or any metal ion or metal halide, typically ferric chloride, iodine, copper chloride or the like, the preferred catalyst at present being ferric chloride.

A preferred embodiment of this invention contemplates combining the reactants in the preferred ratio given in Table I previously. The reaction mixture of acetic acid, p-xylene and anhydrous ferric chloride is heated typically to a temperature of about 60° to 75° C. before addition of chlorine is begun. The major portion of the chlorine addition is effected at a temperature between 80° and 90° C.

The reaction is completed upon evolution or collection of the desired amount of HCl, typically on the addition of 10% excess of chlorine. The resultant reaction mixture is cooled and the desired product separated by pouring the crude reaction product into an excess of water, e.g., 2 to 10 parts by weight, preferably with stirring until the solid product precipitates. This desired dinuclear chloro substituted p-xylene may be separated through filtration and purified by recrystallization from ethanol in the presence of decolorizing carbon resulting in better than 60% pure yield. A by-product oil is also separated comprising 2-chloro-p-xylene; 2,3-dichloro-p-xylene and 2,5-dichloro-p-xylene. This oil may be further chlorinated giving useful nuclear and chain chlorinated derivatives.

The following specific examples are intended further to illustrate the present invention and are offered so that those skilled in the art may more completely understand the present invention and the means by which the same may be carried into effect.

A series of chlorinations of p-xylene is carried out using glacial acetic acid as a solvent and "a chlorination stopping agent." In each of the examples listed in Table I, 53 g. of p-xylene is mixed with 250 ml. of acetic acid, the amount of chlorine added corresponding to the mol ratio of chlorine to p-xylene shown in Table I. Each chlorination is carried out at a temperature between 70° and 110° C. with chlorine being added at a rate of about 1 to 2 g./minute. Upon the evolution of the stoichiometric amount of hydrogen chloride, the reaction product is poured into an excess of water with stirring until the desired 2,5-dichloro-p-xylene precipitates. The by-product oil comprising 2-chloro-p-xylene; 2,3-dichloro-p-xylene and 2,5-dichloro-p-xylene advantageously is utilized in the production of higher chlorinated xylene derivatives. The solid 2,5-dichloro-p-xylene precipitated is recrystallized from ethanol employing decolorizing carbon with the resultant yield being listed in Table II:

TABLE II

*Preparation of 2,5-dichloro-p-xylene*

| Example | Temp., °C. | Cat. | G. Cat. | Mole Ratio, Cl₂/Xyl. | G. Prod. | G. Oil | Percent Recovery (Crude Yield) | Percent Yield (Pure) [1] |
|---|---|---|---|---|---|---|---|---|
| 1 | 70 | FeCl₃ | 0.5 | 2.25 | 58 | 26 | 96 | 66 |
| 2 | 70 | FeCl₃ | 0.5 | 2.82 | 68 | 21 | 101 | 77 |
| 3 | 70 | I₂ | 0.5 | 2.0 | 61 | 15 | 87 | 70 |
| 4 | 70 | I₂ | 0.5 | 2.25 | 76 | 5 | 92 | 87 |
| 5 | 70 | I₂ | 0.5 | 2.82 | 63 | 20 | 95 | 72 |
| 6 | 110 | I₂ | 0.5 | 2.0 | 57 | 19 | 87 | 65 |
| 7 | 110 | I₂ | 0.5 | 2.25 | 68 | 14 | 93 | 78 |
| 8 | 110 | I₂ | 0.5 | 2.82 | 58 | 22 | 91 | 66 |
| 9 | 70 | I₂ | 0.5 | 2.0 | 56 | 14 | 80 | 64 |
| 10 | 70 | I₂ | 2.0 | 2.0 | 58 | 18 | 87 | 66 |
| 11 | 70 | I₂ | 0.5 | 2.25 | 58 | 20 | 89 | 66 |
| 12 | 70 | I₂ | 2.0 | 2.25 | 62 | 17 | 90 | 71 |
| 13 | 110 | I₂ | 2.0 | 2.0 | 68 | 12 | 91 | 78 |
| 14 | 110 | I₂ | 2.0 | 2.25 | 54 | 33 | 99 | 62 |

[1] After first recrystallization.

In view of the prior art, it would be expected that regardless of the solvent used, a tetrachloro nuclear substituted p-xylene would result. However, surprisingly, glacial acetic acid prevents chlorination of p-xylene above dinuclear chlorination.

This is demonstrated by chemically mixing 212 g. (2.0 mole) of p-xylene with about 354 g. (10.0 mole) of chlorine in the presence of 300 ml. of glacial acetic acid and 1.0 g. of FeCl₃ at a temperature between 70° and 96° C. over a period of about 6 hours. Employing this method of preparation only mono and di-halo nuclear substituted p-xylene is formed. However when carbon tetrachloride, ethylene dichloride, or 1,2-dichloropropane are substituted for the glacial acetic acid as solvent in essentially the same method of chlorination, a substantial quantity of tri and tetrachloro nuclear substituted p-xylene results.

Upon examining the data resulting from Examples 1 through 14 given in Table I previously, it may be concluded that a slight excess of chlorine increases the yield of the final product. However, a large excess of chlorine offers no further advantage. It also is evident that better yields are obtained at lower temperatures.

It is to be understood that although the invention has been described with specific reference to specific embodiments thereof, it is not to be so limited since changes and alterations therein may be made which are within the full intended scope of this invention and as defined by the appended claims.

What is claimed is:

1. The method of producing a dinuclear chlorinated xylene which comprises combining the following:

|  | Parts by weight |
|---|---|
| Glacial acetic acid | 2.7 to 10.0 |
| Xylene | 1.0 |
| Chlorine | 0.8 to 2.0 |
| Catalyst selected from the group consisting of ferric chloride and iodine | 0 to 0.4 | and effecting chlorination of said xylene.

2. The method according to claim 1 wherein the chlorination product is combined with water to precipitate a dichlorinated product.

3. The method of producing a nuclear dichlorinated xylene which comprises combining the following:

|  | Parts by weight |
|---|---|
| Glacial acetic acid | 3.7 to 4.1 |
| Xylene | 1.0 |
| Chlorine | 1.30 to 1.60 |
| Ferric chloride | 0.005 to 0.010 | and effecting chlorination of said xylene.

4. The method of producing a dinuclear halogenated xylene which comprises combining the following:

|  | Parts by weight |
|---|---|
| Glacial acetic acid | 2.7 to 10.0 |
| Xylene | 1.0 |
| Halogen | 0.8 to 2.0 |
| Catalyst selected from the group consisting of ferric halide and iodine | 0 to 0.4 | and effecting halogenation of said xylene.

5. The method of preparing 2,5-dichloro-p-xylene comprising dichlorinating p-xylene in the presence of a solvent quantity of glacial acetic acid and ferric chloride catalyst wherein 2,5-dichloro-p-xylene is separated.

References Cited in the file of this patent

UNITED STATES PATENTS 2,608,591   Lawlor   Aug. 26, 1952
2,835,700   Boyle et al.   May 20, 1958

OTHER REFERENCES

Migrdichian Organic Synthesis; vol. II, Reinhold Publishing Co. (1957), pp. 1534–5 relied on.